Nov. 7, 1967  M. E. GERRY  3,350,983
SLIDE RETAINER AND SOUND TRACK FRAME
Filed Aug. 18, 1965 2 Sheets-Sheet 1
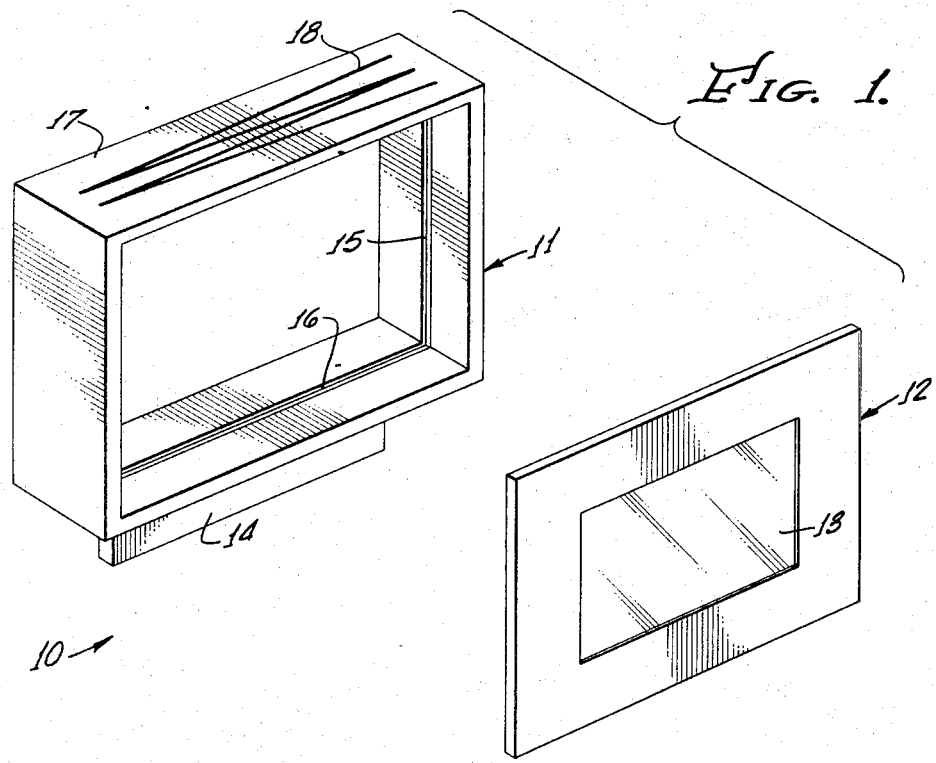
FIG. 1.
FIG. 2.
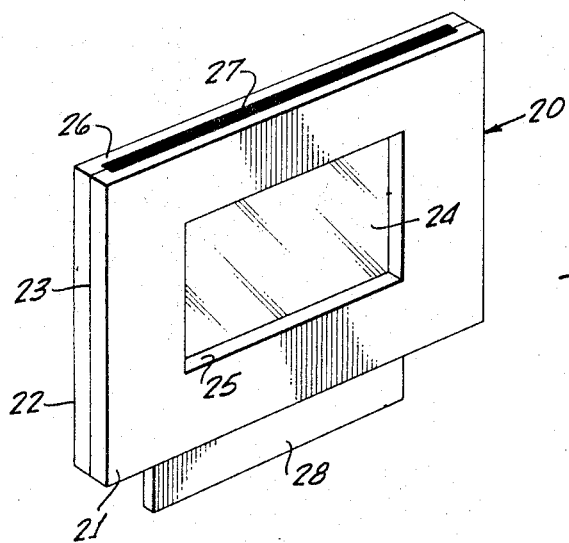
Martin E Gerry
INVENTOR.

United States Patent Office 3,350,983
Patented Nov. 7, 1967

3,350,983
SLIDE RETAINER AND SOUND TRACK FRAME
Martin E. Gerry, 13452 Winthrope St.,
Santa Ana, Calif. 92705
Filed Aug. 18, 1965, Ser. No. 480,599
2 Claims. (Cl. 88—28)

ABSTRACT OF THE DISCLOSURE

A frame retaining a visual information slide and providing adequate surface for a sound track is usable in conjunction with a camera or a projector with sound. Also provided is an extension by means of which the frame is injected into the photographic apparatus.

---

The present invention relates to improvements in slide retainer frames bearing a sound track.

One object of the invention is the reduction in bulky and structurally complex sound track adaptor frames or retainers which contain sound and visual information.

Another object of the invention is to adapt a sound track retaining frame into which a mounted slide with visual information thereon may be inserted in and securely retained by a frame on which a sound track is recordable and reproducible.

A further object of the invention is to use a two sectional frame between which a visual information slide is mechanically retained, and the two sectional frame having a sound track on any outer surface of either or both sections of the two sectional frame, which outer surface is orthogonal to the plane of the visual information slide.

Still a further object of the invention is to have a zig-zag scanned sound track recordable and reproducible on the outer surface of any member of a window or shadow box shaped frame which outer surface is in a plane orthogonal to the plane of a mounted visual information slide, which mounted slide is inserted into and held by said window or shadow box shaped frame.

Still a further object of the invention is to provide extension guides to the frames for insertion into an automatic injection mechanism for automatic injection and ejection of said frames.

The accompanying drawings illustrate but do not limit the several preferred embodiments of the invention, in which:

FIG. 1 is a perspective view of a mounted visual information slide and a window or shadow box shaped frame into which the mounted slide is inserted and securely held, and said frame having an extension for cooperation with an automatic frame injection mechanism of a record-reproduce projector or camera.

FIG. 2 is a perspective view of a visual information slide mounted between and held by two sections of a frame bearing a sound track, and said frame having an extension for cooperation with an automatic frame injection mechanism of a record-reproduce projector or camera.

Figure 3:
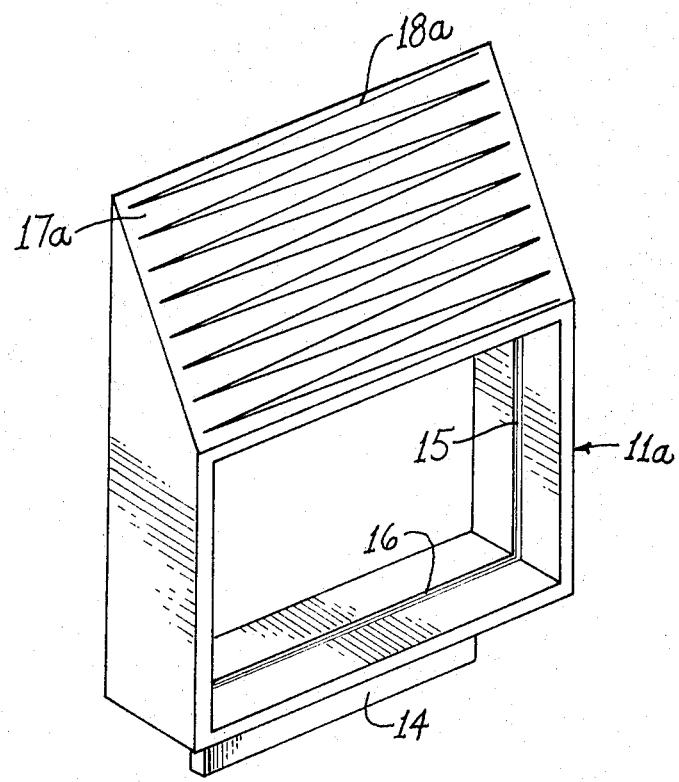
FIG. 3 is a frame similar to the frame of FIG. 1 but with an angularly pitched surface.

Referring to FIGS. 1 and 3, visual information slide 13 is mounted in a cardboard or other material slide retainer 12, and retainer 12 is inserted into and held by a pair of grooves 15 in the inner surface of both vertical members of frame 11 (only one groove is shown), and in groove 16 in the inner surface of the lower member of frame 11, to form the complete frame and mounted slide assembly 10. The outer surface 17 of frame 11 is coated with magnetic recording material so that a scanning device (not shown) of a magnetic recorder-reproducer may superimpose or reproduce sound track 18 on the said outer surface 17. The surface 17 is in a plane which is orthogonal to the plane of the visual information slide 13 as mounted in slide retainer 12 when said retainer 12 is positioned in grooves 15 and 16. Any outer or portions of inner surfaces of frame 11 are usable for recording or reproducing a sound track, said surfaces being in planes orthogonal to the plane of the visual information slide 13 as held in slide retainer 12 when said retainer 12 is positioned in grooves 15 and 16. Frame 11 is normally of the window or shadow box shape construction. Frame 11a has a similar function to that of frame 11. A portion or one of the structural members of frame 11a, whose outer surface 17a has a sound track 18a superimposed thereon, may be oriented at an angle whose plane is greater than zero degrees but less than 90 degrees with respect to the plane of the visual information slide when retained in said frame, so as to afford a greater record-reproduce sound track area. Frames 11 or 11a may have as an integral portion thereof extension 14 which is used in connection with an automatic frame injection-ejection mechanism (not shown) of a record-reproduce projector or camera. The surface 17 or any outer or inner surface in a plane orthogonal to the plane of the visual information slide 13 as held in slide retainer 12 and positioned in grooves 15 and 16, may be coated with a plastic material or the entire frame 11 may be made of a plastic material, and sound track 18 may be a groove made by a stylus of a scanning device (not shown) of a record-reproduce projector or of a similar scanning mechanism in a camera.

Referring to FIG. 2, sound and visual information slide 20 is comprised of sections 21 and 22 between which is cemented or otherwise mechanically mounted visual information slide 24 in aperture 25 which is common to both sections 21 and 22. The two said sections 21 and 22, with the visual information slide 24 between said sections 21 and 22, are bonded together by cement, adhesive, or other bonding material at bond line 23. All or part of upper surface 26 common to both sections 21 and 22 has deposited thereon a magnetic recording material on which is recorded and reproduced sound track 27 by a scanning device (not shown) of a record-reproduce projector or a similar scanning device of a camera. The surface 26 may be coated with a plastic material or the entire frame 20 may be made of a plastic material and sound track 27 may be a groove made by a stylus of a scanning device (not shown) of a record-reproduce projector or of a similar scanning mechanism of a camera. Frame 20 has as an integral portion thereof extension 28 which is used in connection with an automatic frame injection-ejection mechanism of a record-reproduce projector or camera (not shown). Sound track 27, may be either a single scan track or a multiple scan zig-zag track similar to zig-zag track 18, or the sound track may be a spiral track, or an elliptical sound, track.

In the case of either FIGS. 1 or 2, the visual information slide is aligned in the aperture or window of either frame when the slide and frame are assembled.

The projector hereinabove mentioned is a photographic slide or other optical projector which has a sound track recording and reproducing capability. The camera mentioned is generally a photographic camera with sound track recording capability, but may also be a camera used in conjunction with video recordings.

I claim:

1. A frame of shadow box configuration retaining a visual information slide aligned in the window of said frame, a portion of said frame being angularly pitched at an acute angle with respect to the plane of the said visual information slide, a sound track being superimposed on the surface of said angularly pitched portion of said frame, and grooves orthogonal to each other disposed within said frame holding said slide in secure alignment in said window.

2. A frame of shadow box configuration retaining a visual information slide aligned in the window of said frame, a sound track on a planar surface of said frame, said surface being in a plane orthogonal to the plane of said window, grooves orthogonal to each other disposed within said frame holding the said slide in secure alignment in said window, and an extension as an integral part of one of the outer surfaces of said frame being orthogonal to the plane of said one of the outer surfaces.

References Cited

UNITED STATES PATENTS

| | | |
|---|---|---|
| 3,282,154 | 11/1966 | Dimitracopoulos et al. __ 88—28 |
| 3,296,925 | 1/1967 | Yamamoto _____ 88—28 |

FOREIGN PATENTS 1,045,122  11/1958  Germany.

NORTON ANSHER, *Primary Examiner.*

RICHARD M. SHEER, *Assistant Examiner.*